C. W. ARMBRUST.
BRAKE SHOE.
APPLICATION FILED MAY 19, 1916.
1,210,582.
Patented Jan. 2, 1917.
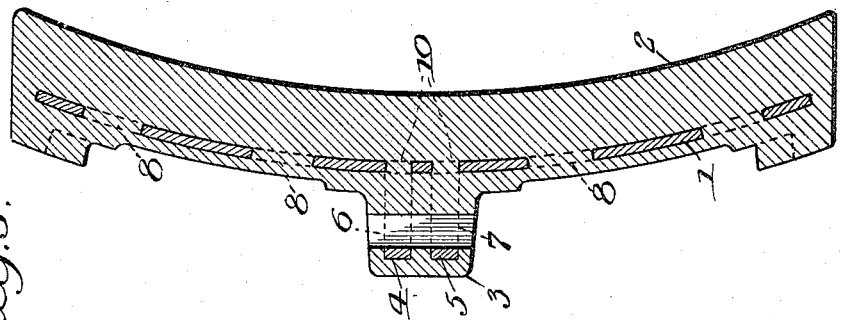
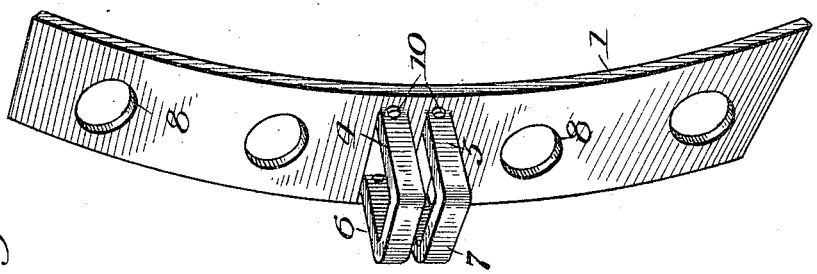
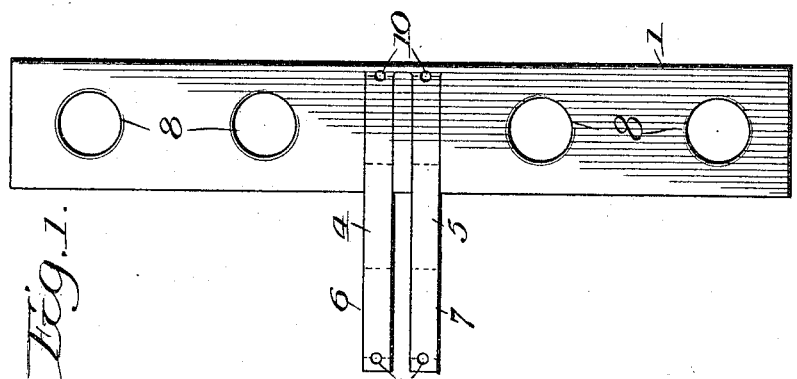
Inventor
Charles W. Armbrust
by Map W Zabel
Atty.

UNITED STATES PATENT OFFICE.

CHARLES W. ARMBRUST, OF CHICAGO, ILLINOIS, ASSIGNOR, BY MESNE ASSIGNMENTS, TO THE AMERICAN BRAKE-SHOE & FOUNDRY COMPANY, OF WILMINGTON, DELAWARE, A CORPORATION OF DELAWARE.

BRAKE-SHOE.

1,210,582. Specification of Letters Patent. Patented Jan. 2, 1917.

Original application filed February 19, 1916, Serial No. 79,237. Divided and this application filed May 19, 1916. Serial No. 98,541.

*To all whom it may concern:*

Be it known that I, CHARLES W. ARMBRUST, a citizen of the United States, residing at Chicago, in the county of Cook and State of Illinois, have invented a certain new and useful Improvement in Brake-Shoes, of which the following is a full, clear, concise, and exact description, reference being had to the accompanying drawings, forming a part of this specification.

My invention relates to brake shoes and has for its object the provision of an improved back for a brake shoe which shall be simple in construction and easy of manufacture.

My invention contemplates forming a key lug from two projecting tongues drawn transversely into position, which key lug is formed partly from transversely drawn metal of the back, and partly from protruding or extending tongues protruding from said back.

This application is a division of my prior application Serial No. 79,237, filed Feb. 19, 1916.

I will explain my invention more in detail by referring to the accompanying drawing illustrating the same, in which—

Figure 1 is a top view of a blank from which the back is formed; Fig. 2 is a perspective view of the completed back, and Fig. 3 is a longitudinal sectional view of a brake shoe provided with my improved back.

My improved back consists of a body portion 1 adapted to be securely fastened together with the brake shoe 2. The key lug 3 is formed by the metal of the brake shoe in conjunction with the key lug portion of the back, which key lug portion consists of the two tongues 4 and 5. These tongues are formed partly from metal drawn transversely out of the back, and partly from the protruding extensions 6 and 7 as more clearly apparent from Fig. 1. The tongues are then bent at four places, as more clearly apparent from Fig. 2, to form the key lug proper. The body portion is provided with holes 8, 8 to permit the metal of the shoe to flow therethrough so as to bind the shoe and back firmly together. Holes 9, 9 and 10, 10 are further provided to hold the portions of the key lug of the back more thoroughly into association with the shoe proper.

As will be readily apparent to those skilled in the art I have thus provided a very simple structure whereby the key lug portion of the back may be formed. It will also be apparent that many modifications may be made within the scope of the appended claims.

Having however thus described one form which my invention may take, what I claim as new and desire to secure by Letters Patent is:

1. A back for a brake shoe provided with a key lug formed of two spaced tongues drawn transversely out of said back.

2. A back for a brake shoe provided with a key lug formed of two parallel tongues drawn transversely out of said back.

3. A back for a brake shoe provided with a key lug formed of a transversely slotted tongue drawn out of said back.

4. A back for a brake shoe provided with a sectional key lug formed of a slotted tongue drawn transversely out of the back.

5. A back for a brake shoe provided with a double continuous key lug formed of two parallel fingers drawn out of the back transversely.

6. A back for a brake shoe having a key lug with a transverse strap underneath said lug, said strap being free at one extremity.

In witness whereof, I hereunto subscribe my name this 12th day of May, A. D., 1916.

CHARLES W. ARMBRUST.

Witnesses:
HAZEL A. JONES,
MAX W. GABEL.